United States Patent
Kim

(10) Patent No.: US 8,505,704 B2
(45) Date of Patent: Aug. 13, 2013

(54) APPARATUS FOR OPERATING CLUTCH

(75) Inventor: Youngho Kim, Wanju-gun (KR)

(73) Assignee: Hyundai Motor Company, Seoul (KR)

( * ) Notice: Subject to any disclaimer, the term of this patent is extended or adjusted under 35 U.S.C. 154(b) by 361 days.

(21) Appl. No.: 12/946,130

(22) Filed: Nov. 15, 2010

(65) Prior Publication Data

US 2012/0024654 A1 Feb. 2, 2012

(30) Foreign Application Priority Data

Jul. 27, 2010 (KR) ........................ 10-2010-0072526

(51) Int. Cl.
*F16D 28/00* (2006.01)

(52) U.S. Cl.
USPC .............. 192/84.6; 192/30 W; 192/89.21; 192/90; 192/93 R; 192/99 S

(58) Field of Classification Search
USPC ................... 192/84.6, 90; 74/337.5
See application file for complete search history.

(56) References Cited

U.S. PATENT DOCUMENTS

| | | | | |
|---|---|---|---|---|
| 1,273,266 A | * | 7/1918 | Patch | 74/337.5 |
| 4,550,625 A | * | 11/1985 | Martin et al. | 74/337.5 |
| 4,591,034 A | * | 5/1986 | Tellert et al. | 192/84.6 |
| 5,881,853 A | * | 3/1999 | Peuster et al. | 192/84.6 |

FOREIGN PATENT DOCUMENTS

| | | |
|---|---|---|
| JP | 8-74880 A | 3/1996 |
| KR | 2002-0081871 A | 10/2002 |
| KR | 10-2009-0062925 A | 6/2009 |

\* cited by examiner

*Primary Examiner* — Rodney Bonck

(74) *Attorney, Agent, or Firm* — Morgan, Lewis & Bockius LLP

(57) ABSTRACT

An apparatus for operating a clutch which may be mounted at a vehicle structure and controls an operation of the clutch may include a motor provided with a motor shaft and receiving electrical energy so as to selectively rotate the motor shaft, a cam mounted at the motor shaft and rotating together with the motor shaft, and a push rod assembly coupled to a clutch fork of the clutch, wherein the push rod assembly may be elastically biased toward and slidably contacted to the cam such that the push rod assembly moves forward or rearward according to a rotating angle of the cam so as to operate the clutch fork.

12 Claims, 5 Drawing Sheets

APPARATUS FOR OPERATING CLUTCH

CROSS-REFERENCE TO RELATED APPLICATION

The present application claims priority to Korean Patent Application No. 10-2010-0072526 filed in the Korean Intellectual Property Office on Jul. 27, 2010, the entire contents of which is incorporated herein for all purposes by this reference.

BACKGROUND OF THE INVENTION

1. Field of the Invention

The present invention relates to an apparatus for operating a clutch. More particularly, the present invention relates to an apparatus for operating a clutch which can control an operation of the clutch precisely by using kinematic means.

2. Description of Related Art

Generally, a driver of a vehicle provided with a manual transmission should push a clutch pedal and moves a shift lever to a target shift-speed for shifting. If the driver pushes the clutch pedal, a clutch is operated so as to prevent engine torque from inputting to the transmission.

As described above, the clutch is disposed between the engine and the transmission, and selectively connects or disconnects the engine and the transmission.

A conventional clutch assembly includes a clutch disk, a clutch cover, a clutch fork, an operation cylinder, a master cylinder, and a clutch pedal.

The clutch disk and the clutch cover are engaged to each other by friction, and torque applied to the clutch cover is selectively transmitted to the clutch disk. That is, if the clutch disk is closely contacted with the clutch cover, the torque of the clutch cover is transmitted to the clutch disk by frictional force. If the clutch disk is parted from the clutch cover, the clutch disk and the clutch cover rotate relatively.

The clutch fork pushes the clutch cover to the clutch disk or pulls the clutch cover from the clutch disk so as to engage or release the clutch. The clutch fork is operated by the operating cylinder.

The master cylinder generates hydraulic pressure supplied to the operating cylinder and is mounted between the clutch pedal and the operating cylinder. Therefore, if the driver pushes the clutch pedal, the master cylinder generates the hydraulic pressure and supplies the hydraulic pressure to the operating cylinder.

A conventional clutch assembly is mainly used in a manual transmission. However, use of the manual transmission decreases because of difficulty in manipulation. Recently, use of a double clutch transmission (DCT) or an automated manual transmission (AMT) increases.

According to the double clutch transmission and the automated manual transmission, manipulation of the clutch is controlled by an electrical signal of a control unit. Therefore, a conventional clutch assembly operated by the hydraulic pressure is hard to be applied to the double clutch transmission and the automated manual transmission.

In addition, an operation stroke of the clutch is not constant according to the clutch assembly operated by the hydraulic pressure. So, it is hard to precisely shut off the torque. Particularly, half clutch may be hard to achieve.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an apparatus for operating a clutch having advantages of precisely shutting off torque by setting an operation stroke for operating the clutch constant and to provide an apparatus for operating a clutch easily achieving a half clutch state.

In an aspect of the present invention, the apparatus for operating a clutch which may be mounted at a vehicle structure and controls an operation of the clutch, include a motor provided with a motor shaft and receiving electrical energy so as to selectively rotate the motor shaft, a cam mounted at the motor shaft and rotating together with the motor shaft, and a push rod assembly coupled to a clutch fork of the clutch, wherein the push rod assembly may be elastically biased toward and slidably contacted to the cam such that the push rod assembly moves forward or rearward according to a rotating angle of the cam so as to operate the clutch fork.

The cam has a distance from the motor shaft to an exterior circumference thereof to be changed according to the rotating angle, wherein the cam has oval shape.

The push rod assembly may include a body slidably contacted with the cam at a rear surface of the body, and a push rod extending forward from a front surface of the body and coupled to the clutch fork, wherein a ball may be formed at a front end of the push rod so as to slidably couple the clutch fork with the push rod.

A cam guide groove may be formed at the rear surface of the body, and a part of the cam may be inserted in the cam guide groove so as to be slidably contacted with the body.

The apparatus may further include a bracket fixed to the vehicle structure to support and guide the push rod assembly, wherein a bracket guide groove may be formed on an outer surface of the body along a longitudinal direction thereof and slidably receives an end portion of the bracket, wherein the bracket includes a guide portion protruding upwards and downwards with a predetermined length to be slidably coupled to the bracket guide groove formed upwards and downwards in a corresponding shape of the guide portion.

The apparatus may further include a stroke sensor detecting a distance that the push rod assembly moves.

In another aspect of the present invention, the apparatus for operating a clutch which may be mounted at a vehicle structure and controls an operation of the clutch may include a motor selectively rotating a motor shaft, a push rod assembly coupled to a clutch fork of the clutch, and a cam formed to an end portion of the motor shaft to convert a rotation movement of the motor shaft into a rectilinear movement of the push rod assembly, wherein the push rod assembly includes a body having a rear surface slidably contacted with the cam so as to receive driving torque of the motor, and a push rod extending forward from a front surface of the body and coupled to the clutch fork, wherein the cam has oval shape.

The apparatus may further include a bracket fixed to the vehicle structure, wherein one end of the bracket may be slidably inserted in a bracket guide groove formed at a side surface of the body so as to guide the movement of the push rod assembly.

The apparatus may further include a stroke sensor detecting a distance that the push rod assembly moves.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
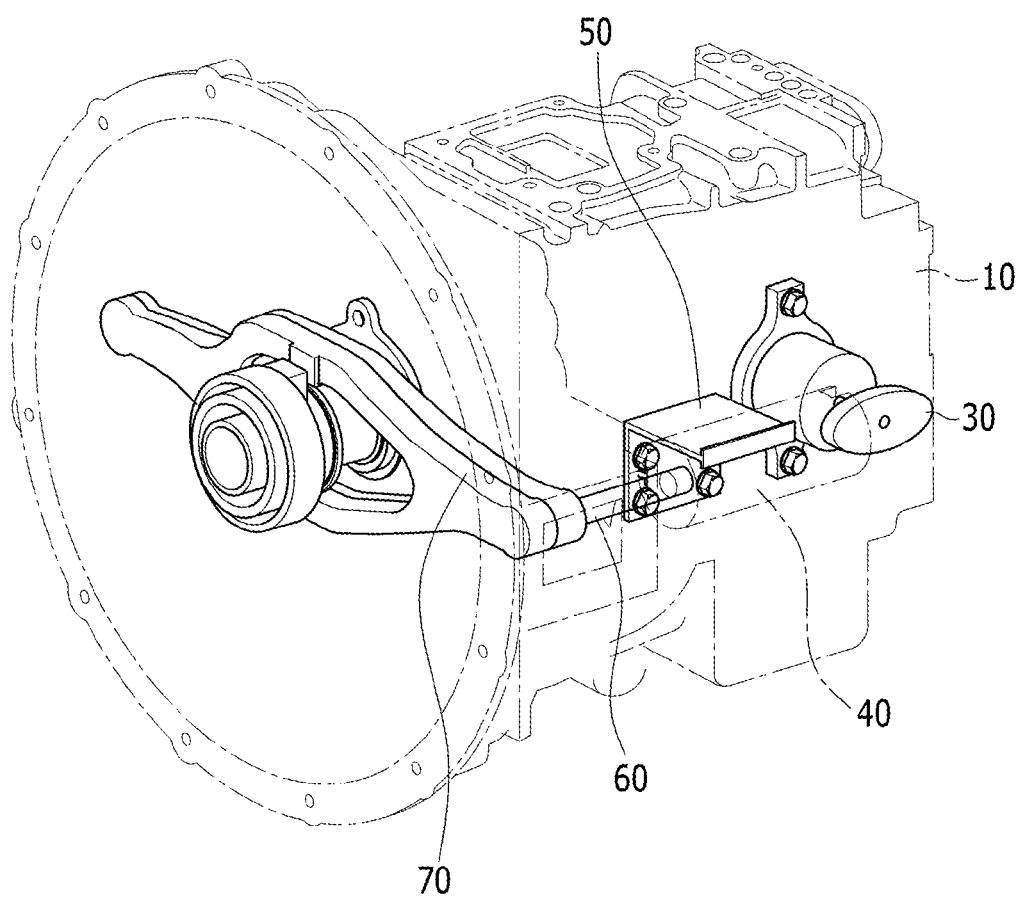
FIG. 1 is a perspective view of a state that an apparatus for operating a clutch according to an exemplary embodiment of the present invention is mounted at a vehicle structure.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

FIG. 1 is a perspective view of a state that an apparatus for operating a clutch according to an exemplary embodiment of the present invention is mounted at a vehicle structure.

As shown in FIG. 1, an apparatus for operating a clutch according to an exemplary embodiment of the present invention is mounted at a vehicle structure. The vehicle structure may be an engine, a transmission, or a vehicle body, and it is exemplified that the transmission 10 is used as the vehicle structure for ease and convenience of explanation.

The apparatus for operating the clutch is disposed between the engine and the transmission 10 and operates the clutch which selectively transmits torque of the engine to the transmission 10 or not.

The clutch includes a clutch disk, a clutch cover, and a clutch fork 70. The clutch cover is connected to the engine so as to receive the torque of the engine, and the clutch disk is connected to the transmission. The clutch cover and the clutch disk are selectively engaged or released by the clutch fork 70 so as to selectively prevent the torque of the engine from being transmitted to the transmission. That is, in a case that the clutch fork 70 connects the clutch disk with the clutch cover, the torque of the engine is transmitted to the transmission 10. On the contrary, in a case that the clutch fork 70 releases the clutch disk from the clutch cover, the torque of the engine is not transmitted to the transmission 10. Herein, it is exemplified that the clutch disk is connected to the clutch cover at an initial state, and the clutch disk is released from the clutch cover at an operating state. For ease of explanation, an engagement of the clutch represents the clutch fork 70 operates, and a release of the clutch represents the clutch fork 70 does not operate.

In addition, an elastic member for applying an elastic force against the operational force of the apparatus is mounted at the clutch fork 70 (or the clutch cover or the clutch disk connected to the clutch fork). Therefore, if the clutch fork 70 operates, the clutch disk is engaged with the clutch cover. On the contrary, if the clutch fork 70 does not operate, the clutch disk is released from the clutch cover by the elastic force of the elastic member.

Because structure and operation of the clutch is well known to a person of an ordinary skill in the art, a detailed description thereof will be omitted in this specification. On the contrary to the description in this specification, the clutch disk may be released from the clutch cover if the clutch fork 70 operates, and the clutch disk may be engaged to the clutch cover by the elastic force of the elastic member if the clutch fork 70 does not operate. Such a case may be a simple variant of the present invention, and may be included the spirit and scope of the present invention.

Figure 2:
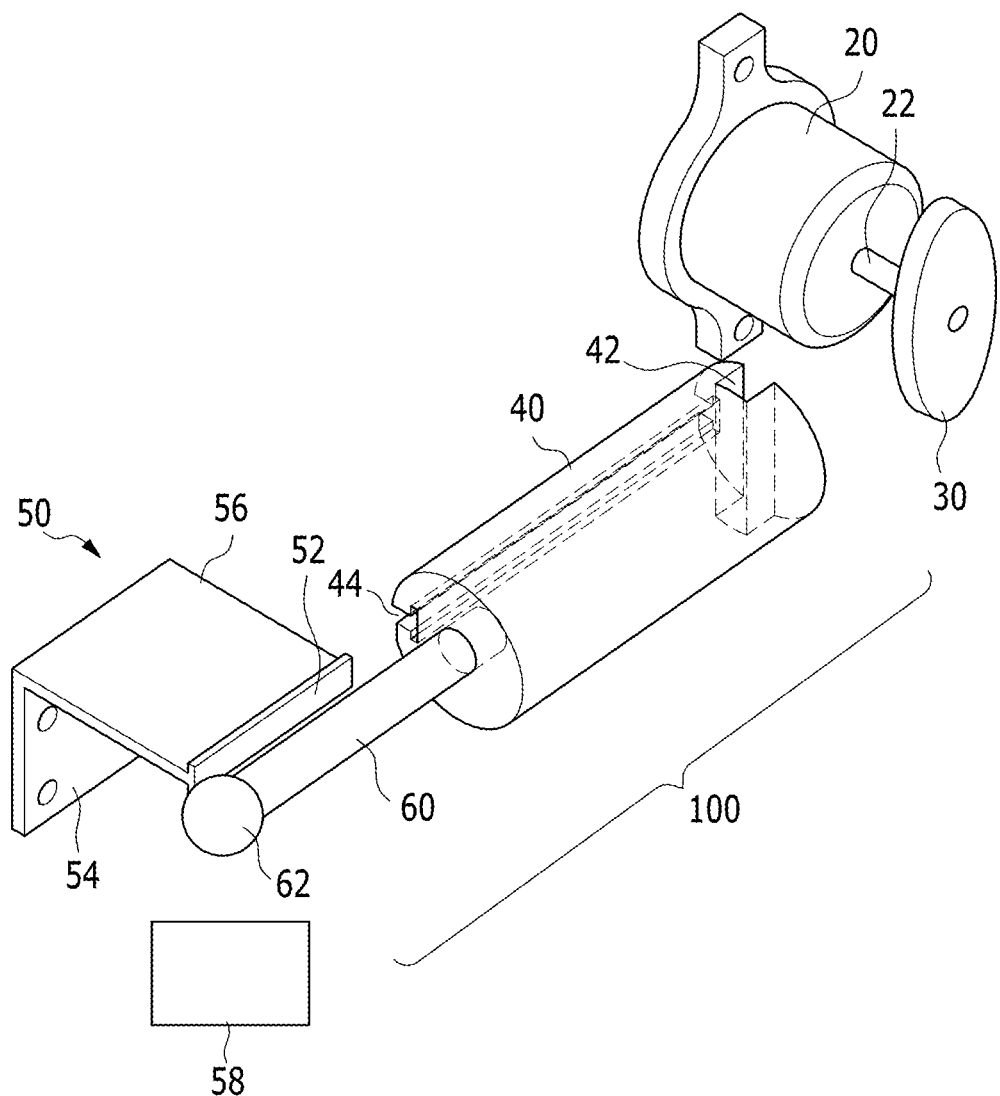
FIG. 2 is an exploded perspective view of an apparatus for operating a clutch according to an exemplary embodiment of the present invention.

FIG. 2 is an exploded perspective view of an apparatus for operating a clutch according to an exemplary embodiment of the present invention.

As shown in FIG. 2, the apparatus for operating the clutch according to an exemplary embodiment of the present invention includes a motor 20, a cam 30, a push rod assembly 100, and a bracket 50.

The motor 20 is fixed to the vehicle structure 10 and converts electrical energy into mechanical energy. The motor 20 includes a stator forming a magnetic field and a rotor rotated by the magnetic field formed by the stator, and a motor shaft 22 is mounted at the rotor.

The cam 30 is mounted at one end of the motor shaft 22, and converts torque of the motor shaft 22 into an operational force of the push rod assembly 100. For this purpose, the cam 30 has oval shape such that a distance from the motor shaft 22 to an exterior circumference thereof is changed according to a rotating angle of the motor shaft 22. The cam 30 is always contacted to a rear surface of the push rod assembly 100 such that the push rod assembly 100 moves forward or rearward as the cam 30 rotates. That is, as the cam 30 rotates, the push rod assembly 100 moves forward if a distance from the motor shaft 22 to a contact point of the push rod assembly 100 and the cam 30 becomes longer, and the push rod assembly 100 moves rearward if the distance from the motor shaft 22 to the contact point of the push rod assembly 100 and the cam 30 becomes shorter.

The push rod assembly 100 moves forward or rearward by the operational force received from the cam 30 and selectively operates the clutch fork 70. For this purpose, the push rod assembly 100 includes a body 40, a push rod 60, and a ball 62.

The body 40 is provided with a cam guide groove 42 at the rear surface thereof and a bracket guide groove 44 formed long at a side surface to a length direction thereof. A part of the cam 30 is inserted in the cam guide groove 42 such that the cam 30 is always contacted with the body 40. The part of the cam 30 inserted in the cam guide groove 42 is changed as the cam 30 rotates. That is, if the cam 30 makes one revolution, all the exterior circumference of the cam 30 contacts with the body 40.

It is exemplified in this specification that the body 40 has cylindrical shape, but the shape of the body 40 is not limited to this.

A push rod 60 is extended forward from a front surface of the body 40. The push rod 60 is fixed to the body 40 so as to move forward or rearward together with the body 40.

The ball 62 is mounted at a front end of the push rod 60. The ball 62 may be integrally formed with the push rod 60. The ball 62 is coupled to the clutch fork 70 so as to connect the clutch fork 70 to the push rod 60.

The bracket 50 guides a movement of the push rod assembly 100. The bracket 50 includes a mounting surface 54, a supporting surface 56, and a guide portion 52.

The mounting surface 54 is mounted at the vehicle structure 10.

The supporting surface 56 is bent from the mounting surface 54 and extends toward the push rod assembly 100.

The guide portion 52 is formed at an end of the supporting surface 56, and is inserted in the bracket guide groove 44 formed at the body 40 so as to guide the push rod assembly 100. So as to prevent the guide portion 52 from being separated from the body 40, the guide portion 52 is protruded upwardly and downwardly from the end of the supporting surface 56. A shape of the bracket guide groove 44 corresponds to that of the guide portion 52.

The apparatus for operating the clutch further includes a stroke sensor 58 detecting a distance the push rod assembly 100 moves. In this specification, the stroke sensor 58 is mounted at the bracket 50 but a position of the stroke sensor 58 is not limited to this.

In addition, the apparatus for operating the clutch further includes a control portion. The control portion selectively applies an electric signal to the motor 20 so as to rotate the cam 30 selectively. That is, the control portion applies the electric signal to the motor 20 in a case that a half clutch state is to be achieved or the apparatus for operating the clutch is to be fully operated.

In addition, the stroke sensor 58 is electrically connected to the control portion. Therefore, the control portion may apply the electric signal to the motor 20 so as to control the rotation of the cam 30 based on a detected value of the stroke sensor 58. Since the operation of the clutch is controlled based on the rotation amount of the cam 30 and/or the distance the push rod assembly 100 moves as described above, torque may be shut off precisely.

Hereinafter, an operation of the apparatus for operating the clutch according to an exemplary embodiment of the present invention will be described.

Figure 3:
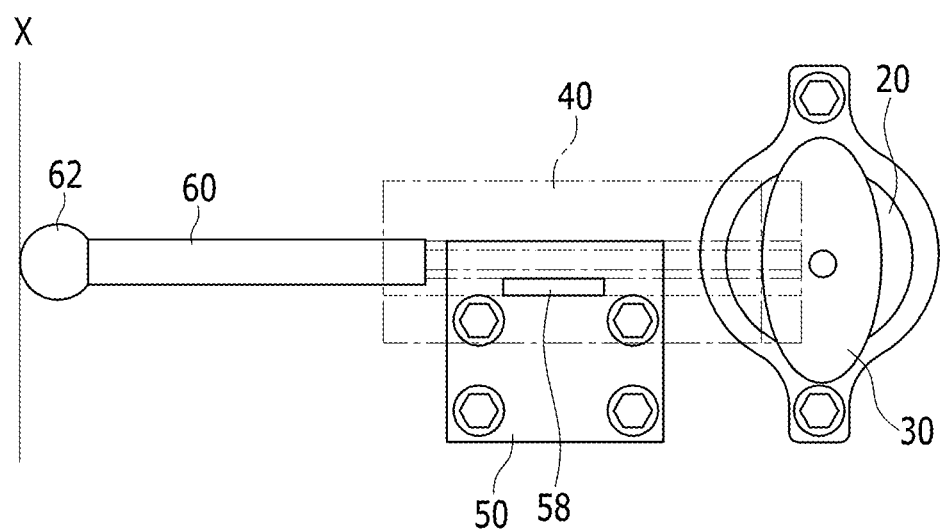
FIG. 3 is a schematic diagram of a state that an apparatus for operating a clutch according to an exemplary embodiment of the present invention is not operated and torque is shut off.
Figure 4:
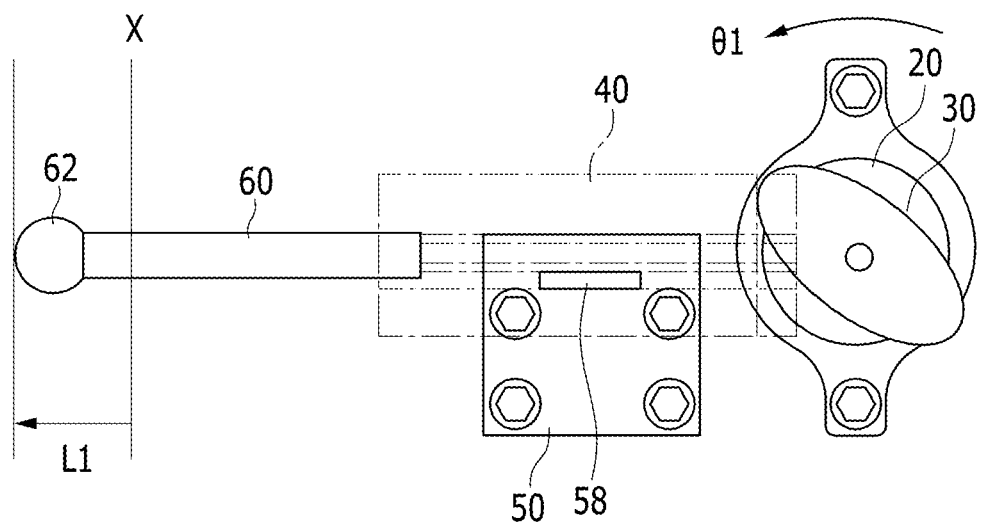
FIG. 4 is a schematic diagram showing a half clutch state of an apparatus for operating a clutch according to an exemplary embodiment of the present invention.
Figure 5:
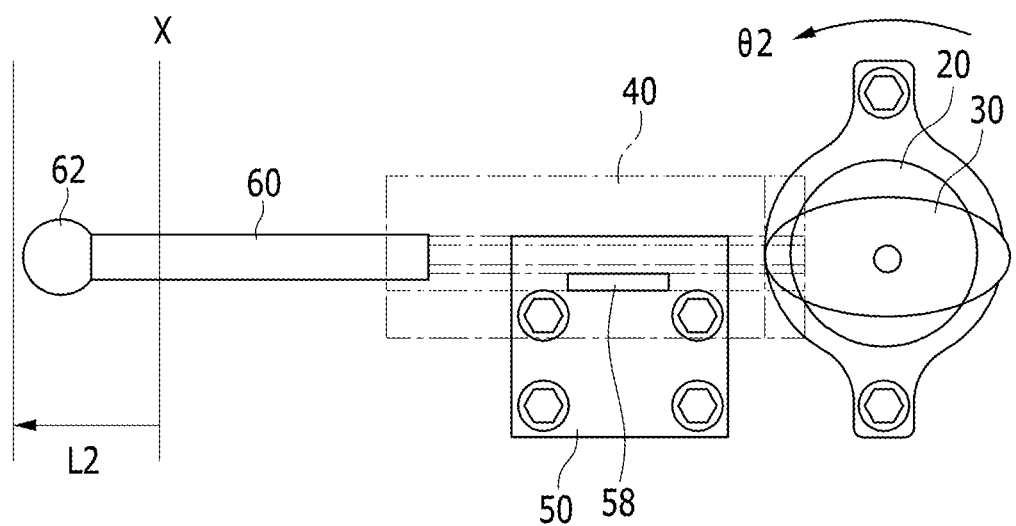
FIG. 5 is a schematic diagram of a state that an apparatus for operating a clutch according to an exemplary embodiment of the present invention is fully operated and torque is connected.

FIG. 3 is a schematic diagram of a state that an apparatus for operating a clutch according to an exemplary embodiment of the present invention is not operated and torque is shut off, FIG. 4 is a schematic diagram showing a half clutch state of an apparatus for operating a clutch according to an exemplary embodiment of the present invention, and FIG. 5 is a schematic diagram of a state that an apparatus for operating a clutch according to an exemplary embodiment of the present invention is fully operated and torque is connected.

If the apparatus for operating the clutch according to an exemplary embodiment of the present invention is not operated, the motor 20 does not operate and an end of the ball 62 is positioned at a reference line x as shown in FIG. 3. Therefore, the clutch cover is separated from the clutch disk and the torque of the engine is not transmitted to the transmission.

If a condition of the half clutch state is satisfied, the control portion rotates the motor 20 by a first predetermined angle $\theta 1$ and accordingly the cam 30 also rotates by the first predetermined angle $\theta 1$ as shown in FIG. 4. At this time, since a distance from the motor shaft 22 to the contact point of the cam 30 and the body 40 becomes longer, the push rod assembly 100 moves forward by a first predetermined distance L1 and pushes the clutch fork 70. Therefore, a slip occurs between the clutch disk and the clutch cover and the half clutch state becomes achieved. At this time, the stroke sensor 58 detects the distance the push rod assembly 100 moves, and the control portion may control the operation of the motor 20 based on the detected value of the stroke sensor 58. That is, the half clutch state may be achieved easily and precisely as a consequence that the control portion controls the distance the push rod assembly 100 moves to be the first predetermined distance L1. The first predetermined angle $\theta 1$ and the first predetermined distance L1 may be an angle and a distance which can achieve the half clutch state, and will be easily set by a person of an ordinary skill in the art considering a size of the clutch.

If a condition where the apparatus for operating the clutch is fully operated is satisfied, the control portion rotates the motor 20 by a second predetermined angle $\theta 2$ and accordingly the cam 30 also rotates by the second predetermined angle $\theta 2$ as shown in FIG. 5. At this time, since the distance from the motor shaft 22 to the contact point of the cam 30 and the body 40 becomes longer, the push rod assembly 100 moves forward by a second predetermined distance L2 and pushes the clutch fork 70 fully. Therefore, the clutch cover is engaged to the clutch disk and the torque of the engine is transmitted to the transmission. The second predetermined angle $\theta 2$ may be 90°.

Meanwhile, if a condition where the apparatus for operating the clutch does not operate is satisfied, the push rod assembly 100 moves rearward by the elastic force of the elastic member and the end of ball 62 returns to the reference line x.

According to an exemplary embodiment of the present invention, a stroke of a clutch is maintained to be constant. Therefore, torque delivery performance may be enhanced.

In addition, a half clutch state may be easily achieved.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for operating a clutch which is mounted at a vehicle structure and controls an operation of the clutch, the apparatus comprising:

a motor provided with a motor shaft and receiving electrical energy so as to selectively rotate the motor shaft;

a cam mounted at the motor shaft and rotating together with the motor shaft; and a push rod assembly coupled to a clutch fork of the clutch, wherein the push rod assembly is elastically biased toward and slidably contacted to the cam such that the push rod assembly moves forward or rearward according to a rotating angle of the cam so as to operate the clutch fork;

wherein the push rod assembly comprises:

a body slidably contacted with the cam at a rear surface of the body; and a push rod extending forward from a front surface of the body and coupled to the clutch fork.

2. The apparatus of claim 1, wherein the cam has a distance from the motor shaft to an exterior circumference thereof to be changed according to the rotating angle.

3. The apparatus of claim 2, wherein the cam has oval shape.

4. The apparatus of claim 1, wherein a ball is formed at a front end of the push rod so as to slidably couple the clutch fork with the push rod.

5. The apparatus of claim 1, wherein a cam guide groove is formed at the rear surface of the body, and a part of the cam is inserted in the cam guide groove so as to be slidably contacted with the body.

6. The apparatus of claim 1, further comprising a bracket fixed to the vehicle structure to support and guide the push rod assembly, wherein a bracket guide groove is formed on an outer surface of the body along a longitudinal direction thereof and slidably receives an end portion of the bracket.

7. The apparatus of claim 6, wherein the bracket includes a guide portion protruding upwards and downwards with a predetermined length to be slidably coupled to the bracket guide groove formed upwards and downwards in a corresponding shape of the guide portion.

8. The apparatus of claim 1, further comprising a stroke sensor detecting a distance that the push rod assembly moves.

9. An apparatus for operating a clutch which is mounted at a vehicle structure and controls an operation of the clutch, the apparatus comprising:

a motor selectively rotating a motor shaft;

a push rod assembly coupled to a clutch fork of the clutch; and a cam formed to an end portion of the motor shaft to convert a rotation movement of the motor shaft into a rectilinear movement of the push rod assembly, wherein the push rod assembly comprises:

a body having a rear surface slidably contacted with the cam so as to receive driving torque of the motor; and a push rod extending forward from a front surface of the body and coupled to the clutch fork.

10. The apparatus of claim 9, wherein the cam has oval shape.

11. The apparatus of claim 9, further comprising a bracket fixed to the vehicle structure, wherein one end of the bracket is slidably inserted in a bracket guide groove formed at a side surface of the body so as to guide the movement of the push rod assembly.

12. The apparatus of claim 9, further comprising a stroke sensor detecting a distance that the push rod assembly moves.

* * * * *